United States Patent
Nakashita et al.

(10) Patent No.: US 9,425,610 B2
(45) Date of Patent: Aug. 23, 2016

(54) POWER SUPPLY CONTROL DEVICE

(71) Applicant: DAIKIN INDUSTRIES, LTD., Osaka-shi, Osaka (JP)

(72) Inventors: Yuuko Nakashita, Sakai (JP); Satoshi Yagi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/376,736

(22) PCT Filed: Jan. 22, 2013

(86) PCT No.: PCT/JP2013/051195
§ 371 (c)(1),
(2) Date: Aug. 5, 2014

(87) PCT Pub. No.: WO2013/118574
PCT Pub. Date: Aug. 15, 2013

(65) Prior Publication Data
US 2015/0029619 A1   Jan. 29, 2015

(30) Foreign Application Priority Data

Feb. 8, 2012 (JP) ................................. 2012-025097

(51) Int. Cl.
*H02H 7/00* (2006.01)
*H02H 7/08* (2006.01)
(Continued)

(52) U.S. Cl.
CPC .............. *H02H 7/0833* (2013.01); *H02M 1/36* (2013.01); *H02M 7/44* (2013.01)

(58) Field of Classification Search
CPC ................................ H02H 7/0833; H02H 7/44

USPC ............................................................ 361/22
See application file for complete search history.

(56) References Cited

U.S. PATENT DOCUMENTS

2009/0007579 A1* 1/2009 Natsume ............... F24F 11/006
62/236
2009/0103336 A1* 4/2009 Nakamura .............. H02M 1/32
363/52

(Continued)

FOREIGN PATENT DOCUMENTS

EP   2 320 555 A2   5/2011
EP   2 621 082 A1   9/2011

(Continued)

OTHER PUBLICATIONS

International Search Report of corresponding PCT Application No. PCT/JP2013/051195 dated May 7, 2013.

(Continued)

*Primary Examiner* — Erick Glass
(74) *Attorney, Agent, or Firm* — Global IP Counselors

(57) ABSTRACT

A power supply control device includes an inverter having plural switching elements, an inverter controller that controls the inverter, a device power supply that generates a first power supplied to the inverter controller, a detector that detects whether there is an abnormality relating to the compressor, and a power supply controller. The inverter generates drive voltages usable to drive a compressor motor that is a drive source of a compressor as a result of the switching elements switching on or off, and outputs the drive voltages to the compressor motor. The power supply controller stops generation of the first power by the device power supply to thereby stop the control of the inverter controller in a case where there is an abnormality relating to the compressor.

6 Claims, 8 Drawing Sheets

(51) Int. Cl.
*H02M 1/36* (2007.01)
*H02M 7/44* (2006.01)

(56) References Cited

U.S. PATENT DOCUMENTS

| | | | |
|---|---|---|---|
| 2010/0296206 A1* | 11/2010 | Doumae | G01R 31/025 361/42 |
| 2012/0033334 A1 | 2/2012 | Saruwatari et al. | |

FOREIGN PATENT DOCUMENTS

| | | | |
|---|---|---|---|
| EP | 2 506 415 A1 | 10/2012 | |
| JP | 9-317687 A | 12/1997 | |
| JP | 11-101541 A | 4/1999 | |
| JP | 2004-190934 A | 7/2004 | |
| JP | 2005-143210 A | 6/2005 | |
| JP | 2006-52660 A | 2/2006 | |
| JP | 2007-282318 A | 10/2007 | |
| JP | 2010-252567 A | 11/2010 | |
| JP | 4738129 B2 | 5/2011 | |
| JP | 2011-114920 A | 6/2011 | |
| KR | 20060108027 A | 10/2006 | |

OTHER PUBLICATIONS

International Preliminary Report of corresponding PCT Application No. PCT/JP2013/051195 dated Aug. 21, 2014.
European Search Report of corresponding EP Application No. 13 74 6195.0 dated May 29, 2015.

* cited by examiner

POWER SUPPLY CONTROL DEVICE

CROSS-REFERENCE TO RELATED APPLICATIONS

This U.S. National stage application claims priority under 35 U.S.C. §119(a) to Japanese Patent Application No. 2012-025097, filed in Japan on Feb. 8, 2012, the entire contents of which are hereby incorporated herein by reference.

TECHNICAL FIELD

The present invention relates to a power supply control device.

BACKGROUND ART

A refrigeration system such as an air conditioning system is equipped with various devices such as a compressor and a fan. Motors are often used as the drive sources of these devices. The motors are driven by power supplied from a commercial power supply (hereinafter referred to simply as power).

In this connection, there are cases where, for example, a high pressure abnormality occurs in the compressor. A high pressure abnormality is a phenomenon where the pressure of the refrigerant after being compressed by the compressor ends up falling outside the normal pressure range for some reason relating to the compressor, resulting in a high pressure state in which the pressure of the refrigerant is higher than a predetermined value on the high pressure side of the range.

To address this, a technology which, in a case where a high pressure abnormality has occurred, cuts off the supply of power to the motors to thereby stop the operation of the refrigeration system is known, as described in Japanese Patent No. 4,738,129.

SUMMARY

Technical Problem

In Japanese Patent No. 4,738,129, a circuit serving as a switch is disposed on a line for supplying power to an inverter, and in a case where a high pressure abnormality has occurred, this switch switches off. However, the power supplied to the line is AC voltage of about 200 V, also has high amperage, and is so-called heavy current. For that reason, there are cases where the switch melts. If the switch melts, the line does not become cut off, so in a case where the microcomputer that controls the inverter has become uncontrollable, the control signal continues to be output from the computer to the inverter and the compressor ends up continuing to operate.

Thus, it is an object of the present invention to provide a power supply control device that can reliably stop the operation of a compressor in a case where an abnormality has occurred in the compressor.

Solution to Problem

A power supply control device pertaining to a first aspect of the present invention comprises an inverter, an inverter controller, a power supply, a detector, and a power supply controller. The inverter has plural switching elements, generates drive voltages for driving a compressor motor that is a drive source of a compressor as a result of the switching elements switching on or off, and outputs the drive voltages to the compressor motor. The inverter controller controls the inverter. The power supply generates first power supplied to the inverter controller. The detector detects whether or not there is an abnormality relating to the compressor. In a case where there is an abnormality relating to the compressor, the power supply controller stops the generation of the first power by the power supply to thereby stop the control of the inverter controller.

In this power supply control device, in a case where there is an abnormality relating to the compressor, the generation of the first power by the power supply is itself stopped, whereby the supply of the first power to the inverter controller is cut off. When the first power becomes no longer supplied to the inverter controller, the inverter controller no longer outputs a signal for controlling the inverter, so the output of the drive voltages from the inverter to the compressor motor stops and the operation of the compressor stops.

In particular, the first power supplied from the power supply to the inverter controller is light current compared to power supplied from a commercial power supply to a line to the inverter. For that reason, even if a switch is disposed on the line interconnecting the commercial power supply and the inverter, and the switch melts, the driving of the compressor motor stops because the inverter controller to which the supply of the first power has been cut off stops the drive control itself. Consequently, the operation of the compressor can be reliably stopped regardless of whether or not the switch has melted and also without the inverter controller becoming uncontrollable.

A power supply control device pertaining to a second aspect of the present invention is the power supply control device pertaining to the first aspect, wherein the power supply generates the first power using outside power supplied from an outside power supply located outside. In a case where there is an abnormality relating to the compressor, the power supply controller stops the generation of the first power by the power supply by cutting off the supply of the outside power to the power supply.

Because of this, in a case where there is an abnormality relating to the compressor, the supply of the outside power to the power supply is cut off, so first the drive control of the inverter by the inverter controller is no longer performed, and as a result the output of the drive voltages to the compressor motor by the inverter is stopped.

A power supply control device pertaining to a third aspect of the present invention is the power supply control device pertaining to the second aspect, wherein the power supply controller has a relay disposed on a power supply line interconnecting the outside power supply and the power supply. The current flowing through the power supply line is smaller than the current flowing in the inverter.

Here, examples of the outside power supply include a commercial power supply. Because the current flowing through the power supply line is smaller than the current flowing in the inverter, it can be said that the power supply line is a line for light current. Because of this, a relay for light current can be used as the relay disposed on the power supply line, an costs can be reduced. Moreover, because a large current like the one flowing in the inverter does not flow in the relay, the danger that the relay will be melted is also low.

A power supply control device pertaining to a fourth aspect of the present invention is the power supply control device pertaining to the first aspect to the third aspect, further comprising an inverter driver. The inverter driver switches the switching elements on or off on the basis of the output of the inverter controller. Additionally, the power supply further generates second power. The second power is separate from the first power and is supplied to the inverter driver. Moreover, in a case where there is an abnormality relating to the compressor, the power supply also stops generating the second power.

In this power supply control device, the power supply generates the second power in addition to the first power, on in a case where there is an abnormality relating to the compressor, the generation of the second power also stops in addition to the generation of the first power. As a result, not only the supply of the first power to the inverter controller but also the supply of the second power to the inverter driver is also cut off. Because of this, in a case where there is an abnormality relating to the compressor, the output of the drive voltages by the inverter stops more reliably.

Advantageous Effects of Invention

According to the power supply control device pertaining to the first aspect of the present invention, the operation of the compressor can be reliably stopped regardless of whether or not the switch has melted and also without the inverter controller becoming uncontrollable.

According to the power supply control device pertaining to the second aspect of the present invention, in a case where there is an abnormality relating to the compressor, the supply of the outside power to the power supply is cut off so first the drive control of the inverter by the inverter controller is no longer performed, and as a result the output of the drive voltages to the compressor motor by the inverter is stopped.

According to the power supply control device pertaining to the third aspect of the present invention, a relay for light current can be used as the relay disposed on the power supply line, so costs can be reduced. Moreover, because a large current like the one flowing in the inverter does not flow in the relay, the danger that the relay will be melted is also low.

According to the power supply control device pertaining to the fourth aspect of the present invention, in a case where there is an abnormality relating to the compressor, the output of the drive voltages by the inverter stops more reliably.

DESCRIPTION OF EMBODIMENT

A power supply control device pertaining to the present invention will be described in detail below with reference to the drawings. The embodiment below is a specific example of the present invention and is not intended to limit the technical scope of the present invention.

(1) Overall Configuration

Figure 1:
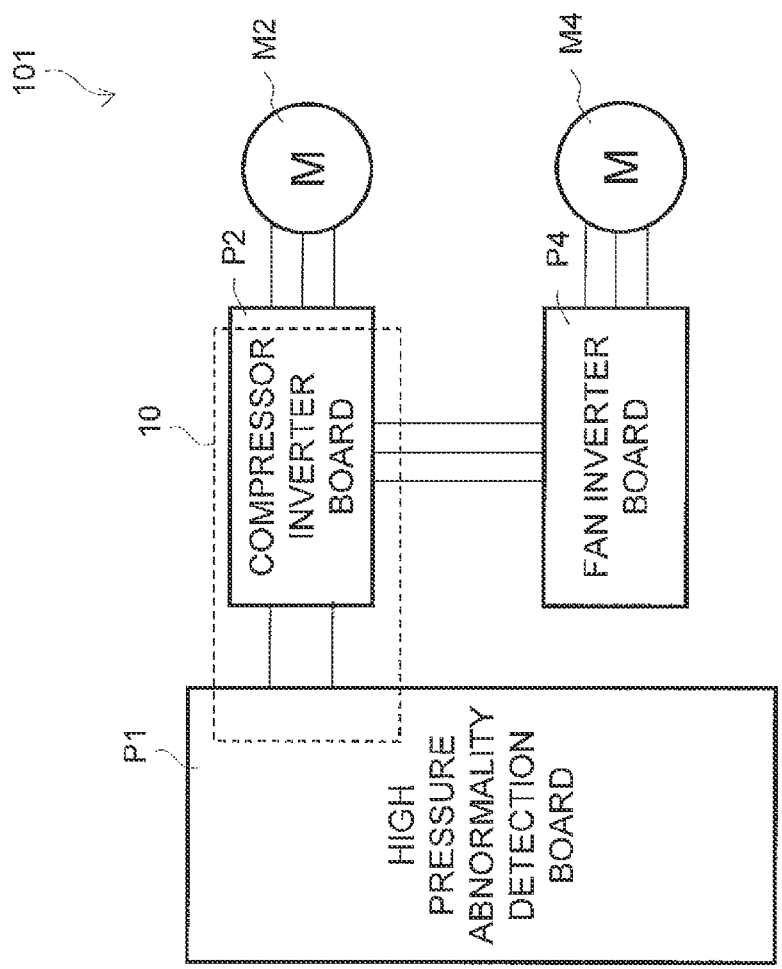
FIG. 1 is a schematic diagram showing the configuration of a motor drive system.

FIG. 1 is a schematic diagram showing the configuration of a motor drive system 101. The motor drive system 101 is configured by plural motors M2, M4, etc., a high pressure abnormality detection board P1 on which some constituent elements of a power supply control device 10 of the present embodiment are mounted, a compressor inverter board P2 on which the remaining constituent elements of the power supply control device 10 are mounted, and a fan inverter board P4.

The motors M2, M4, etc. are drive sources of compressors disposed in outdoor units of an air conditioning system that is an example of a refrigeration system and drive sources of fans likewise disposed in the outdoor units, and can, for example, be three-phase brushless DC motors. Although they are not shown in the drawings, the motors M2, M4, etc. have a stator configured by plural drive coils, a rotor configured by a permanent magnet, and a Hall element for detecting the position of the rotor relative to the stator.

The high pressure abnormality detection board P1 is connected via harnesses to the inverter boards P2 and P4. The high pressure abnormality detection board P1 not only centrally controls the inverter boards P2 and P4 but also detects abnormalities relating to the compressors. Here, examples of abnormalities relating to the compressors include a high pressure abnormality.

The compressor inverter board P2 is a board for driving a compressor motor M2, and the fan inverter board P4 is a board for driving a fan motor M4. The inverter boards P2 and P4 are electrically connected via harnesses to the corresponding motors M2 and M4. Furthermore, the inverter boards P2 and P4 are also electrically connected to one another via harnesses.

In the present embodiment, plural compressors are disposed, but for convenience of description, FIG. 1 shows a case where there is one combination of the compressor motor M2 and the compressor inverter board P2. However, in a case where in actuality there are plural compressors, the combination of the compressor motor M2 and the compressor inverter board P2 is disposed for each compressor. For that reason, although they are not all shown in FIG. 1, there exist plural combinations of the compressor motor M2 and the compressor inverter board P2.

(2) Detailed Configurations

Circuit configurations mounted on each board will be described in detail below.

(2-1) High Pressure Abnormality Detection Board

Figure 2:
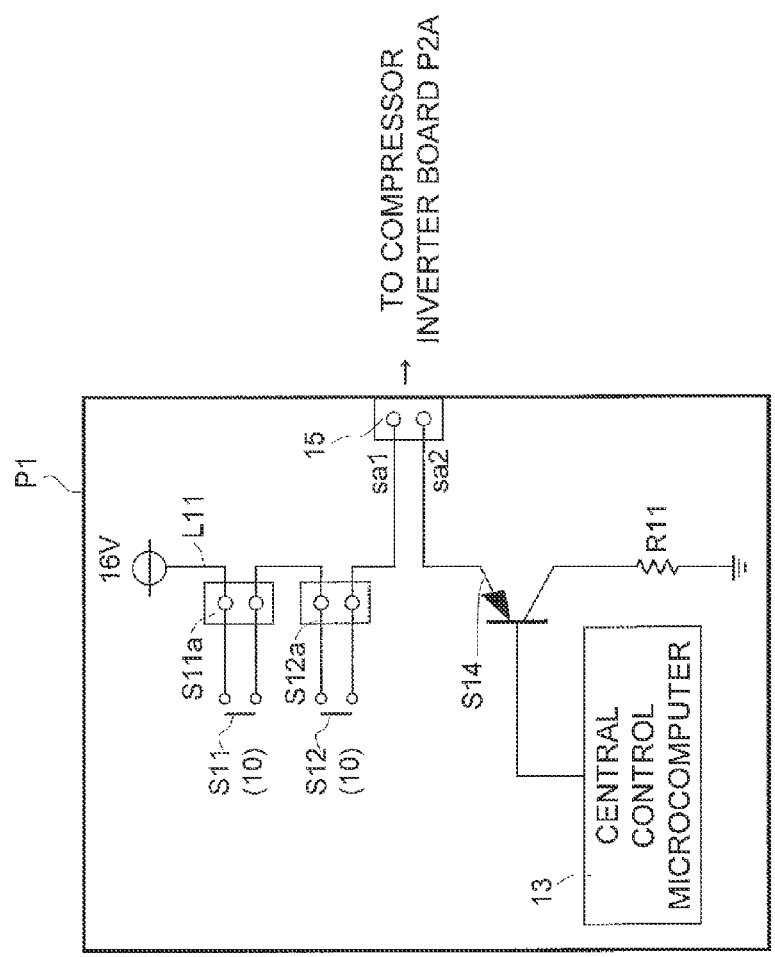
FIG. 2 is a diagram schematically showing a circuit configuration (which includes part of a power supply control device pertaining to an embodiment) mounted on a high pressure abnormality detection board.

FIG. 2 is a diagram schematically showing the circuit configuration mounted on the high pressure abnormality detection board P1. As shown in FIG. 2, the high pressure abnormality detection board P1 is mainly equipped with abnormality detection switches S11 and S12 (which correspond to detectors), a central control microcomputer 13, a central control switch S14, and an interface 15. The abnormality detection switches S11 and S12 are some of the constituent elements of the power supply control device 10 pertaining to the present embodiment.

(2-1-1) Abnormality Detection Switches

The abnormality detection switches S11 and S12 are connected in series via sockets S11a and S12a disposed on a power supply line L11 of about 16 V. The abnormality detection switches S11 and S12 are disposed in correspondence to the number of compressors in the outdoor units and detect whether or not there is an abnormality in the corresponding compressors. Specifically, in a case where the pressure of the refrigerant after being compressed by a corresponding compressor ends up falling outside the normal pressure range for some reason relating to that compressor, resulting in a high pressure state in which the pressure of the refrigerant is higher than a predetermined value on the high pressure side of the pressure range, the abnormality detection switches S11 and S12 act so that the state of the switches themselves change. That is, the abnormality detection switches S11 and S12 pertaining to the present embodiment are high pressure switches (HPS) that detect a high pressure abnormality.

Here, in the present embodiment, normally-closed contacts are employed as the abnormality detection switches S11 and S12. That is, the abnormality detection switches S11 and S12 assume an on state in a case where there is no abnormality in a corresponding compressor (that is, a normal case). Conversely, the abnormality detection switches S11 and S12 assume an off state in a case where there is an abnormality in a corresponding compressor. In particular, a voltage (here, about 16 V) lower than about 30 V is applied as a light current voltage to the abnormality detection switches S11 and S12 in the present embodiment.

Furthermore, FIG. 2 pertaining to the present embodiment shows as an example a case where the number of compressors in the outdoor units is two and consequently the two abnormality detection switches S11 and S12 are also disposed. Consequently, if there is an abnormality in at least one of the two compressors, at least one of the series-connected abnormality detection switches S11 and S12 switches to the off state, so the power supply line L11 of about 16 V in FIG. 2 becomes cut off.

The voltage of about 16 V applied to the power supply line L11 is generated by a switching power supply (not shown in the drawings) likewise mounted on the high pressure abnormality detection board P1.

Hereinafter, for convenience of description, the section where the abnormality detection switch S12 and the interface 15 are interconnected will be called a "connection point sa1".

(2-1-2) Central Control Microcomputer

The central control microcomputer 13 centrally controls the devices configuring air conditioning system, such as the compressors, the fans, and the motors M2, M4, etc. Specifically, when various signals are input from these devices to the central control microcomputer 13, the central control microcomputer 13 controls, on the basis of the signals, the driving of the motors (e.g., the motors M2, M4, etc.) serving as the drive sources of the devices. A more specific example of the control by the central control microcomputer 13 includes the following.

The central control microcomputer 13 detects the values of leakage currents in the motors M2, M4, etc. Additionally, in a case where the detection result in regard to at least one of the motors M2, M4, etc. exceeds a predetermined value, the central control microcomputer 13 judges that a current abnormality is occurring in any of the motors M2, M4, etc. and stops the relevant motor M2, M4, etc.

In order to perform the control described above, the central control microcomputer 13 outputs to the switch S14 a voltage for switching on and off the central control switch S14.

(2-1-3) Central Control Switch

The central control switch S14 is configured by a p-channel bipolar transistor and is connected in series between the abnormality detection switches S11 and S12 and a resistor R11 positioned on the ground side. Specifically, the emitter of the central control switch S14 is connected to the abnormality detection switch S12 via the interface 15, the base of the central control switch S14 is connected to the output of the central control microcomputer 13, and the collector of the central control switch S14 is connected to the ground via the resistor R11.

The central control switch S14 assumes an on or off state on the basis of the control by the central control microcomputer 13. Specifically, in a case where the central control microcomputer 13 has judged that a current abnormality or the like is not occurring, a voltage (i.e., "L") of about 0 V that switches on the central control switch S14 is output from the computer 13, whereby the central control switch S14 assumes the on state. However, in a case where the central control microcomputer 13 has judged that a current abnormality or the like has occurred, about 16 V (i.e., "H") that switches off the central control switch S14 is output from the computer 13, whereby the central control switch S14 assumes the off state.

Consequently, in the high pressure abnormality detection board P1, the power supply line L11 of about 16 V in FIG. 2 becomes cut off not only due to the detection of an abnormality in a compressor by the abnormality detection switches S11 and S12 but also, for example, due to the detection of leakage current in the motors M2, M4, etc. In particular, even in a state in which the abnormality detection switches S11 and S12 have failed and are unable to perform the abnormality detection, the power supply line L11 of about 16 V is cut off by the result of detecting leakage current, so it can be said that safety is increased.

Hereinafter, for convenience of description, the section where the emitter of the central control switch S14 and the interface 15 are interconnected will be called a "connection point sa2".

(2-1-4) Interface

The interface 15 is for electrically connecting the high pressure abnormality detection board P1 to the compressor inverter board P2 and is configured by a connector to which end sections of two harnesses extending from the inverter board P2 are connected.

The interface 15 is connected in series to the abnormality detection switch S12 and the central control switch S14 and between these switches S12 and S14 on the power supply line L11. Consequently, the two harnesses extending from the compressor inverter board P2 are connected to the two connection points sa1 and sa2 via the interface 15.

(2-2) Compressor Inverter Board

Figure 3:
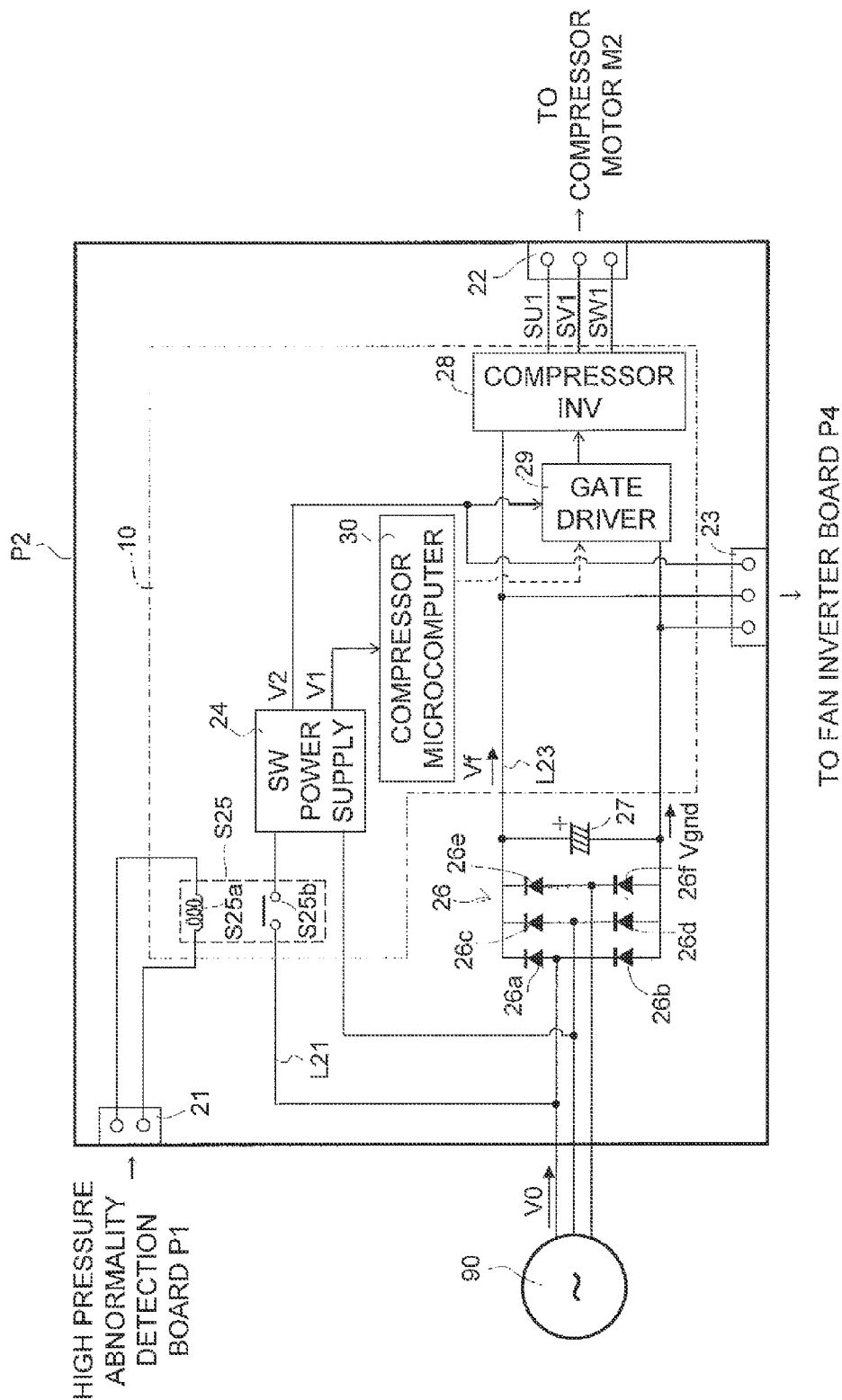
FIG. 3 is a diagram schematically showing a circuit configuration (which includes part of the power supply control device pertaining to the embodiment) mounted on a compressor inverter board.

FIG. 3 is a diagram schematically showing the circuit configuration mounted on the compressor inverter board P2. As shown in FIG. 3, the compressor inverter board P2 is mainly equipped with three interfaces 21, 22, and 23, a switching power supply 24, a power supply control switch 25 (which corresponds to a power supply controller), a rectifier 26, a smoothing capacitor 27, a compressor inverter 28, a compressor gate driver 29 (which corresponds to an inverter driver), and a compressor microcomputer 30 (which corresponds to an inverter controller).

The power supply control device 10 pertaining to the present embodiment is configured by the abnormality detection switches S11 and S12 on the high pressure abnormality detection board P1 already described and the switching power supply 24, the power supply control switch 25, the compressor inverter 28, the compressor gate driver 29, and the compressor microcomputer 30 on the compressor inverter board P2.

(2-2-1) Interfaces

The interface 21 is for electrically interconnecting the high pressure abnormality detection board P1 and the compressor inverter board P2. The interface 21 is formed by a connector to which the other end sections of the two harnesses having one end each connected to the interface 15 of the high pressure abnormality detection board P1 are connected. That is, the interface 21 is for connecting the connection point sa1 and the connection point sa2 on the high pressure abnormality detection board P1 to the circuit on the compressor inverter board P2.

The interface 22 is for electrically interconnecting the compressor motor M2 and the compressor inverter board P2. The interface 23 is for electrically interconnecting the fan inverter board P4 and the compressor inverter board P2. The interfaces 22 and 23 are formed by connectors to which three harnesses each are connected. Because of the interface 22, later-described drive voltages SU1, SV1, and SW1 are output to the compressor motor M2. Because of the interface 23, later-described second power V2 is supplied and voltages Vf and Vgnd are applied to the fan inverter board P4.

(2-2-2) Switching Power Supply

The input side of the switching power supply 24 is connected to a commercial power supply (which corresponds to an outside power supply) 90 located outside the air conditioning system, and the output side of the switching power supply 24 is connected to the compressor microcomputer 30 and the compressor gate driver 29. The switching power supply 24 uses commercial power V0 (which corresponds to outside power) supplied from the commercial power supply 90 to generate first power V1 supplied to the compressor microcomputer 30 and second power V2 supplied to the compressor gate driver 29.

Here, the first power V1 and the second power V2 are both powers having a DC voltage. The first power V1 and the second power V2 are mutually different powers; for example, the first power V1 can be about 5 V and the second power V2 can be about 15 V. The commercial power V0 is three-phase AC power having a voltage of about 200 V.

Figure 4:
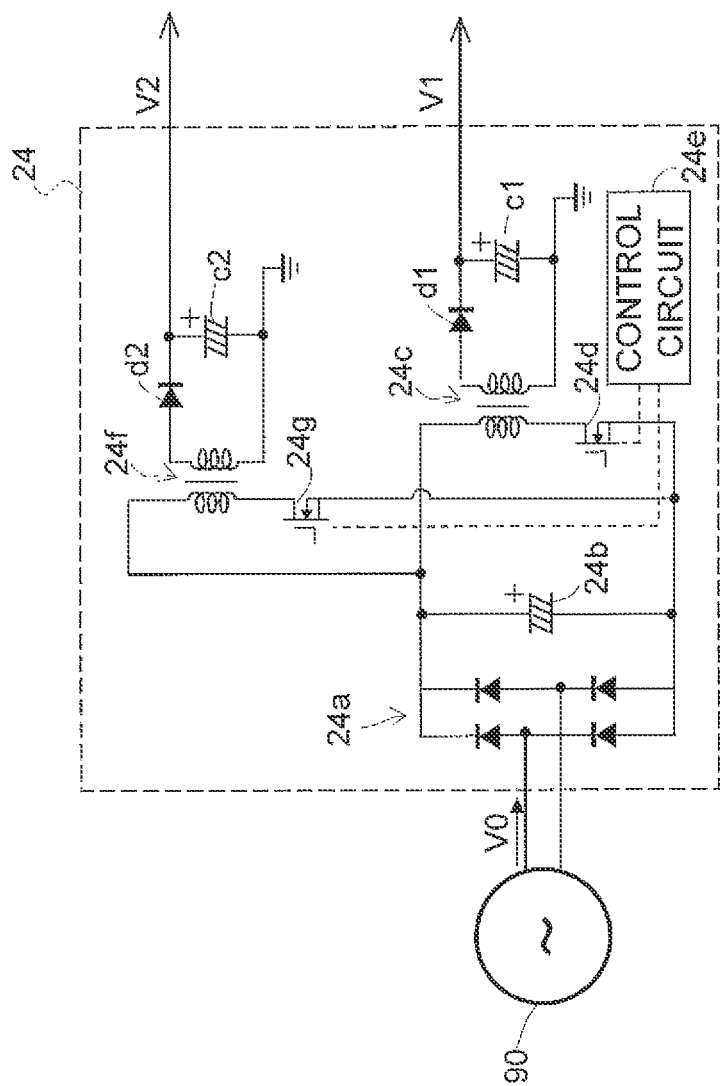
FIG. 4 shows an example of a circuit configuration of a switching power supply.

FIG. 4 shows an example of the detailed configuration of the switching power supply 24. The switching power supply 24 pertaining to FIG. 4 is mainly configured by a rectifier 24*a*, a smoothing capacitor 24*b*, a first voltage high frequency transformer 24*c*, a first voltage switching element 24*d*, a control circuit 24*e*, a second voltage high frequency transformer 24*f*, and a second voltage switching element 24*g*.

When the commercial power V0 from the commercial power supply 90 is input to the switching power supply 24, the commercial power V0 is rectified in the rectifier 24*a* and next is smoothed by the smoothing capacitor 24*b*, which is an electrolytic capacitor on the primary side. The switching elements 24*d* and 24*g* repeatedly switch on and off at individual frequencies, whereby the smoothed voltage becomes high frequency AC voltages in the high frequency transformers 24*c* and 24*f*. The switching on and off of the switching elements 24*d* and 24*g* is controlled by the control circuit 24*e*, and the switching elements 24*d* and 24*g* repeatedly switch on and off at mutually different frequencies.

When the high frequency AC voltages reach the secondary side via the high frequency transformers 24*c* and 24*f*, the voltages are rectified by diodes d1 and d2 on the secondary side, next are smoothed by electrolytic capacitors c1 and c2 on the secondary side, and become DC voltages. The DC voltage smoothed by the electrolytic capacitor c1 is output from the switching power supply 24 as the first power V1, and the DC voltage smoothed by the electrolytic capacitor c2 is output from the switching power supply 24 as the second power V2.

(2-2-3) Power Supply Control Switch

The power supply control switch S25 is for switching on and off the supply of the commercial power V0 from the commercial power supply 90 to the switching power supply 24. That is, the power supply control switch 25 can, as a result of the switch 25 itself switching off, stop the supply of the first power V1 and the second power V2 by the switching power supply 24 to thereby stop the control by the compressor microcomputer 30 and the driving of the compressor gate driver 29.

As shown in FIG. 3, the power supply control switch S25 is configured by one relay coil S25*a* and one relay switch S25*b*.

The relay coil S25*a* is connected, via the interface 21, in series to the connection point sa1 and the connection point sa2 on the high pressure abnormality detection board P1 and between the points sa1 and sa2. Consequently, the relay coil S25*a* becomes connected, via the connection point sa1 and the connection point sa2 on the high pressure abnormality detection board P1, in series to the abnormality detection switches S11 and S12 and the central control switch S14 on the board P1. The voltage between both ends of the relay coil S25*a* is equal to the voltage difference between the connection point sa1 and the connection point sa2.

The relay switch S25*b* is disposed on a power supply line L21 interconnecting the output of the commercial power supply 90 and the input of the switching power supply 24. More specifically, the line extending from the commercial power supply 90 branches midway into a line extending to the rectifier 26 and the power supply line L21 extending to the switching power supply 24. The relay switch S25*b* is disposed on the power supply line L21 extending from the branching point to the switching power supply 24. The relay switch S25*b* switches on or off on the basis of the value of the voltage between both ends of the relay coil S25*a*.

The current flowing through the power supply line L21 is smaller than the current flowing through the compressor inverter 28. That is, motor current flows in the compressor inverter 28 in the order of transistors Q28*a*, Q28*c*, and Q28*e* on the upper side in the inverter 28, the compressor motor M2, and transistors Q28*b*, Q28*d*, and Q28*f* on the lower side in the inverter 28 (see FIG. 5). The motor current is about 30 A, for example. Meanwhile, due to the circuit configuration, motor current does not flow on the power supply line L21, and the magnitude of the current flowing through the power supply line L21 is about 1 A. Consequently, current that is lower compared to the motor current flows on the power supply line L21, so a relay switch for light current can be used as the relay switch S25*b* positioned on the power supply line L21. Moreover, because a large current like the motor current does not flow in the relay switch S25*b*, the relay switch S25*b* also does not end up being melted.

Here, the actions of the power supply control switch S25 will be described. In the case of a normal state in which no abnormality relating to a compressor is occurring, the abnormality detection switches S11 and S12 are both on, and the central control switch S14 is also on, a voltage of about 16 V is applied to the connection point sa1 and a voltage near about 0 V is applied to the connection point sa2. For that reason, the voltage between both ends of the relay switch S25*b* becomes maintained at about 16 V, resulting in the relay switch S25*b* switching to the on state. However, if at least one of the abnormality detection switches S11 and S12 detects an abnormality relating to a compressor and switches off, the voltage of about 16 V becomes no longer applied to the connection point sa1, resulting in a high impedance state. For that reason, the voltage between both ends of the relay coil S25*a* becomes unable to be maintained at the predetermined voltage (specifically, about 16 V), resulting in the relay switch S25*b* switching off. Furthermore, when the central control switch S14 is switched off by the central control microcomputer 13, the voltage near about 0 V becomes no longer supplied to the connection point sa2, resulting in a high impedance state. For that reason, in this case also, the voltage between both ends of the relay coil S25*a* becomes unable to be maintained at the predetermined voltage (specifically, about 16 V) resulting in the relay switch S25*b* switching off.

(2-2-4) Rectifier

The rectifier 26 is configured by six diodes 26*a*, 26*b*, 26*c*, 26*d*, 26*e*, and 26*f*. The diodes 26*a* and 26*b*, 26*c* and 26*d*, and 26*e* and 26*f* are connected in series to one another, and these are connected in such a way as to be parallel to one another. The connection points between the series-connected diodes 26*a* and 26*b*, 26*c* and 26*d*, and 26*e* and 26*f* are connected to the three-phase commercial power supply 90. The AC commercial power V0 output from the commercial power supply 90 is rectified by the rectifier 26.

(2-2-5) Smoothing Capacitor

One end of the smoothing capacitor 27 is connected to the positive output terminal of the rectifier 26, and the other end of the smoothing capacitor 27 is connected to the negative output terminal of the rectifier 26. The smoothing capacitor 27 smooths the voltage rectified by the rectifier 26. The voltage smoothed by the smoothing capacitor 27 (hereinafter called a smoothed voltage Vf) becomes a relatively low ripple voltage and is applied to the compressor inverter 28 on the stage following the smoothing capacitor 27.

Examples of types of capacitors include electrolytic capacitors, ceramic capacitors, and tantalum capacitors, but an electrolytic capacitor is employed as the smoothing capacitor 27.

(2-2-6) Compressor Inverter

The compressor inverter 28 is connected in parallel to both ends of the smoothing capacitor 27 on the stage following the smoothing capacitor 27, and the smoothed voltage Vf and a ground voltage Vgnd are applied to the compressor inverter 28. The compressor inverter 28 outputs three-phase drive voltages SU1, SV1, and SW1 to the compressor motor M2 to thereby drive the compressor motor M2.

Figure 5:
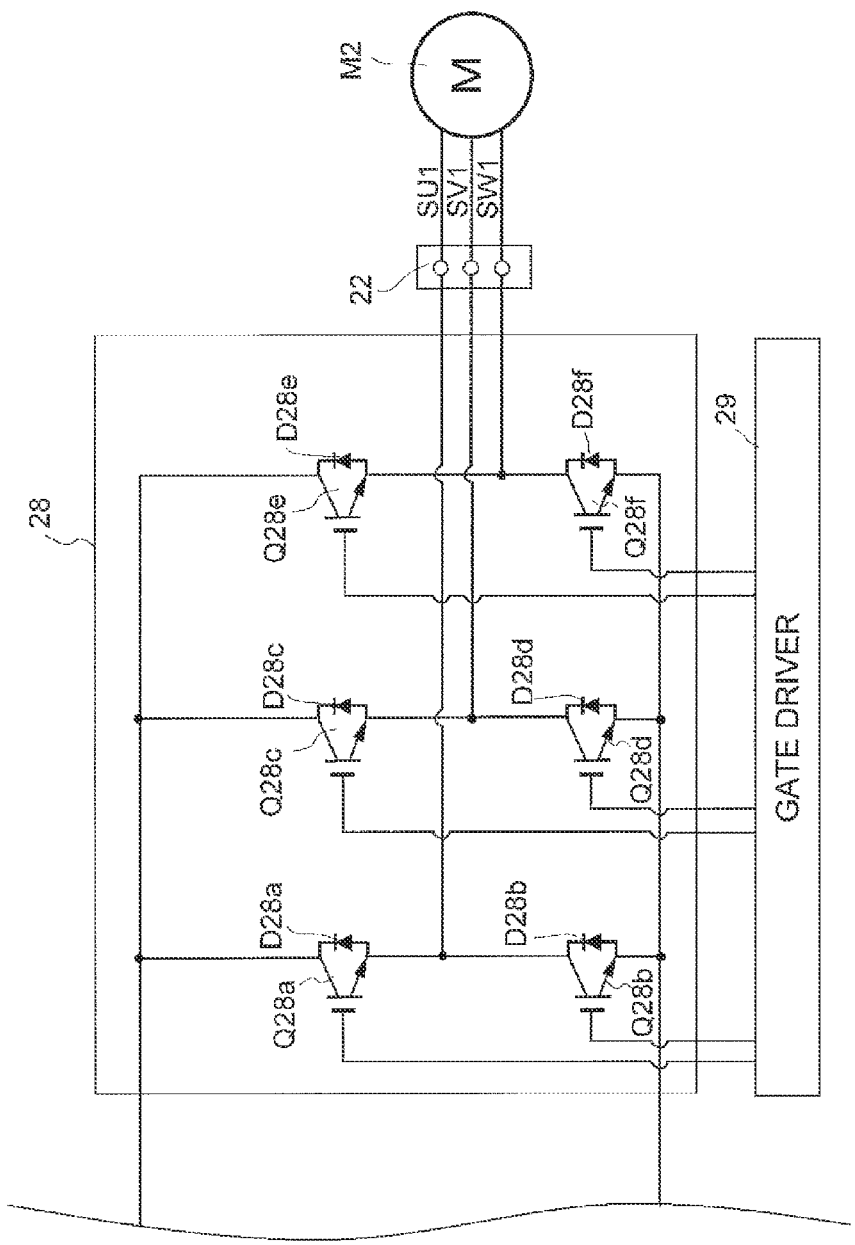
FIG. 5 is a diagram schematically showing a circuit configuration of an inverter.

As shown in FIG. 5, the compressor inverter 28 is configured by plural insulated gate bipolar transistors Q28*a*, Q28*b*, Q28*c*, Q28*d*, Q28*e*, and Q28*f* (which correspond to switching elements; hereinafter simply called transistors) and plural reflux diodes D28*a*, D28*b*, D28*c*, D28*d*, D28*e*, and D28*f*. The transistors Q28*a* and Q28*b*, Q28*c* and Q28*d*, and Q28*e* and Q28*f* are connected in series to one another, and the diodes D28*a* to D28*f* are connected in parallel to the transistors Q28*a* to Q28*f*.

The compressor inverter 28 generates the drive voltages SU1 to SW1 for driving the compressor motor M2 as a result of the transistors Q28*a* to Q28*f* switching on and off at a predetermined timing, and the compressor inverter 28 outputs the voltages SU1 to SW1 to the compressor motor M2 via the interface 22. Because of the drive voltages SU1 to SW1, the compressor motor M2 can rotate.

(2-2-7) Compressor Gate Driver

The compressor gate driver 29 is connected to the switching power supply 24 and the compressor microcomputer 30 as shown in FIG. 3 and to the gates of the transistors 28*a* to Q28*f* as shown in FIG. 5.

The compressor gate driver 29 is supplied with the second power V2 from the switching power supply 24 and is driven using this power V2. The compressor gate driver 29 switches the transistors Q28*a* to Q28*f* on and off by controlling the application of gate voltage to the transistors Q28*a* to Q28*f* in the compressor inverter 28 on the basis of the output (specifically, an instruction signal described below) from the compressor microcomputer 30.

(2-2-8) Compressor Microcomputer

The compressor microcomputer 30 is configured by a CPU, a RAM, and a ROM and is connected to the switching power supply 24 and the compressor gate driver 29. The compressor microcomputer 30 is supplied with the first power V1 generated in the switching power supply 24 and controls the compressor inverter 28 by controlling the driving of the compressor gate driver 29.

Specifically, the compressor microcomputer 30 outputs, to the compressor gate driver 29, an instruction signal for driving the compressor motor M2 at a predetermined speed because of a command to drive the motor from the central control microcomputer 13 on the high pressure abnormality detection board P1. Because of this, the compressor gate driver 29 outputs a gate voltage that switches on and off the transistors Q28*a* to Q28*f* of the compressor inverter 28 at a predetermined frequency. Furthermore, in a case where the compressor microcomputer 30 has acquired a command to stop driving the motor from the central control microcomputer 13, the compressor microcomputer 30 outputs, to the compressor gate driver 29, an instruction signal for stopping the rotation of the compressor motor M2. Because of this, the compressor gate driver 29 outputs a "0 V" gate voltage to the transistors Q28*a* to Q28*f*.

In particular, in the present embodiment, in a case where an abnormality relating to a compressor has occurred or in a case where leakage current in at least one of the motors M2, M4, etc. has occurred, the power supply control switch S25 switches off, so the supply of the commercial power V0 to the switching power supply 24 is cut off and the generation of the first power V1 by the switching power supply 24 stops. In this case, because the supply of the first power V1 to the compressor microcomputer 30 is cut off, the compressor microcomputer 30 no longer controls the compressor inverter 28, and the compressor motor M2 stops rotating.

(2-3) Fan Inverter Board

Figure 6:
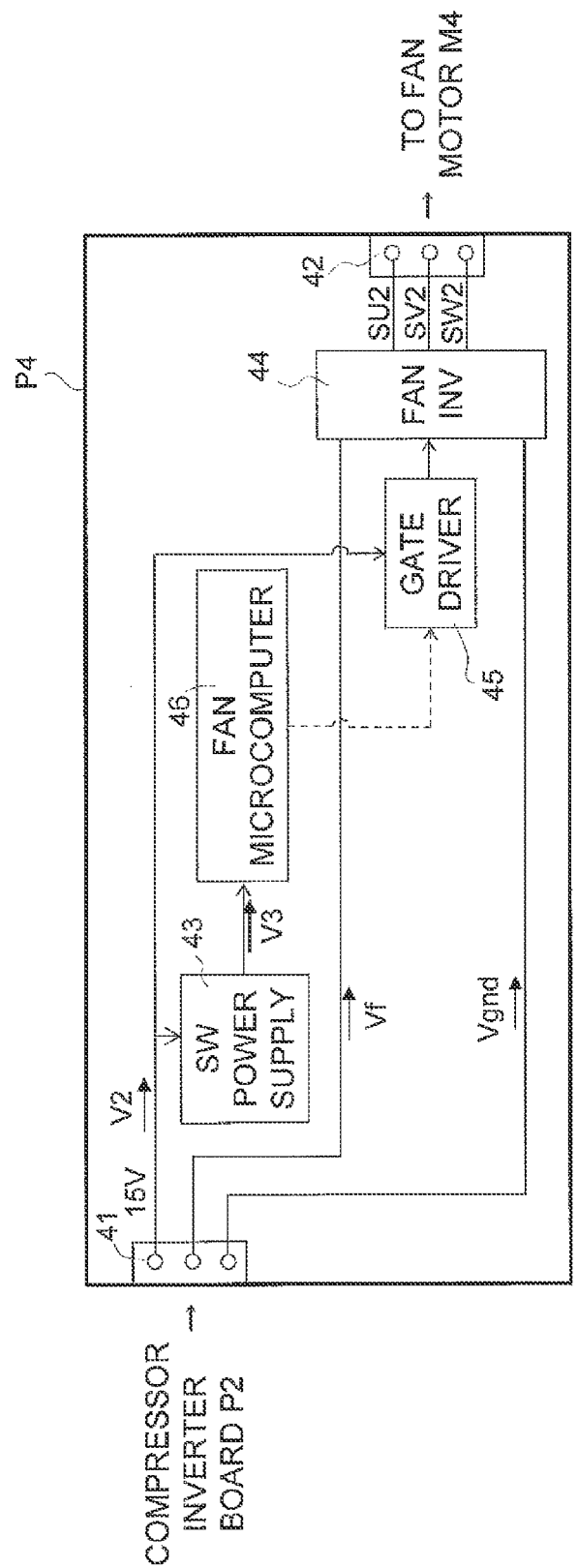
FIG. 6 is a diagram schematically showing a circuit configuration mounted on a fan inverter board.

FIG. 6 is a diagram schematically showing the circuit configuration mounted on the fan inverter board P4. The fan inverter board P4 is mainly equipped with two interfaces 41 and 42, a switching power supply 43, a fan inverter 44, a fan gate driver 45, and a fan microcomputer 46.

(2-3-1) Interface

The interface 41 is for electrically interconnecting the compressor inverter board P2 and the fan inverter board P4. The interface 41 is formed by a connector to which three harnesses are connected. Because of the interface 41, the second power V2 is supplied and the smoothed voltage Vf and the ground voltage Vgnd are applied from the compressor inverter board P2 to the fan inverter board P4.

The interface 42 is for electrically interconnecting the fan motor M4 and the fan inverter board P4. The interface 42 is formed by a connector to which three harnesses are connected. Because of the interface 42, later-described drive voltages SU2, SV2, and SW2 are output to the fan motor M4.

(2-3-2) Switching Power Supply

The input side of the switching power supply 43 is connected to the switching power supply 24 on the compressor inverter board P2 via the interface 41, and the output side of the switching power supply 43 is connected to the fan microcomputer 46 on the fan inverter board P4. The switching power supply 43 is supplied with the second power V2 from the compressor inverter board P2 via the interface 41. The switching power supply 43 uses the second power V2 to generate third power V3 supplied to the fan microcomputer.

Here, the third power V3 is power having a DC voltage like the first and second powers V1 and V2. The third power V3 can be about 5 V which is lower than the second power V2 that is about 15 V.

Examples of the detailed configuration of the switching power supply 43 include a configuration that is the same as the configuration for generating the first power V1 in FIG. 4. That is, the switching power supply 24 on the compressor inverter board P2 employs a configuration where, in order to generate the two powers V1 and V2, the transformers 24c and 24f and the switching elements 24d and 24g on the primary side and the circuit configurations on the secondary side (specifically, the diodes d1 and d2 and the electrolytic capacitors c1 and c2) are connected in parallel in twos as shown in FIG. 4. However, the switching power supply 43 on the fan inverter board P4 can, in order to generate just the one power V3, have a configuration that has, in addition to the rectifier 24a and the smoothing capacitor 24b FIG. 4, one each of the transformer 24c and the switching element 24d on the primary side and the diode d1 and the electrolytic capacitor c1 configuring the circuit on the secondary side.

(2-3-3) Fan Inverter

The fan inverter 44 is connected on the stage following the smoothing capacitor 27 of the compressor inverter board P2 and in parallel to both ends of the smoothing capacitor 27 via the interface 41, and the smoothed voltage Vf and the ground voltage Vgnd are applied to the fan inverter 44. The fan inverter 44 outputs, to the fan motor M4 via the interface 42, three-phase drive voltages SU2, SV2, and SW2 for driving the motor M4. Because of this, the fan motor M4 can rotate.

The configuration of the fan inverter 44 is the same as the circuit configuration of the compressor inverter 28 shown in FIG. 5.

(2-3-4) Fan Gate Driver

The fan gate driver 45 is connected to the switching power supply 24 on the compressor inverter board P2 via the interface 41 as shown in FIG. 6. Moreover, the fan gate driver 45 is connected to the fan microcomputer 46 and the fan inverter 44 (more specifically, the gates of the transistors of the fan inverter 44).

The fan gate driver 45 is supplied with the second power V2 from the switching power supply 24 and is driven using the power V2. The fan gate driver 45 causes the fan inverter 44 to generate and output the drive voltages SU2, SV2, and SW2 by controlling the application of the gate voltage to the transistors in the fan inverter 44 on the basis of an instruction signal that is the output from the fan microcomputer 46.

(2-3-5) Fan Microcomputer

The fan microcomputer 46 is configured by a CPU, a RAM, and a ROM and is connected to the switching power supply 43 and the fan gate driver 45. The fan microcomputer 46 is supplied with the third power V3 generated in the switching power supply 43 and controls the fan inverter 44 by controlling the driving of the fan gate driver 45.

Specifically, the fan microcomputer 46 outputs, to the fan gate driver 45, an instruction signal for driving the fan motor M4 at a predetermined speed because of a command to drive the motor from the central control microcomputer 13 on the high pressure abnormality detection board P1. Because of this, the fan gate driver 45 outputs a gate voltage that switches on and off the transistors of the fan inverter 44 at a predetermined frequency. Furthermore, in a case where the fan microcomputer 46 has acquired a command to stop driving the motor from the central control microcomputer 13, the fan microcomputer 46 outputs, to the fan gate driver 45, an instruction signal for stopping the rotation of the fan motor M4. Because of this, the fan gate driver 45 outputs a "0 V" gate voltage to the transistors of the fan inverter 44.

In particular, in the present embodiment, when the power supply control switch S25 has switched off due to the occurrence of an abnormality relating to a compressor or leakage current in at least one of the motors M2, M4, etc., the supply of the commercial power V0 to the switching power supply 24 is cut off, so the generation of the second power V2 by the switching power supply 24 stops. For this reason, the supply of the second power V2 to the switching power supply 43 is also cut off and the supply of the third power V3 to the fan microcomputer 46 is also cut off. Consequently, in this case, the fan microcomputer 46 no longer controls the fan inverter 44, and the fan motor M4 stops rotating.

(3) Actions

Next, the actions of the power supply control device 10 pertaining to the present embodiment and the motors M2, M4, etc. will be described.

Figure 7:
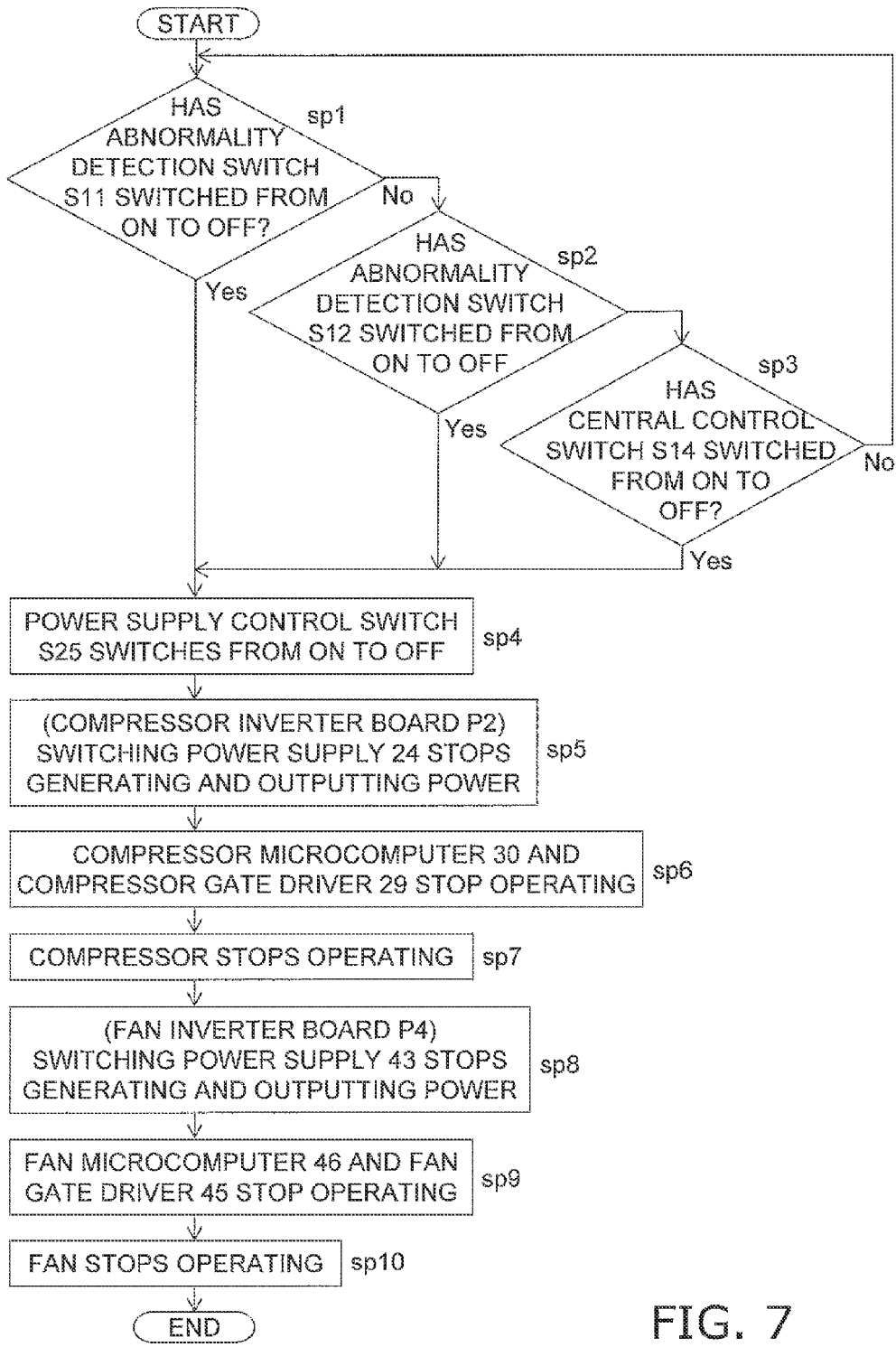
FIG. 7 is a flowchart showing a flow of actions of the power supply control device pertaining to the embodiment and motors.

FIG. 7 is a flowchart showing a flow of actions in the power supply control device 10 and the motors M2, M4, etc. Here, first it will be assumed that an operation is being preformed wherein the compressors are normal and no leakage current is occurring in any of the motors M2, M4, etc. That is, it will be assumed that the switches S11, S12, and S14 on the high pressure abnormality detection board P1 and the power supply control switch S25 on the compressor inverter board P2 are all on and that the motors M2, M4, etc. are being driven on the basis of the drive voltages SW to SW1, SU2 to SW2, etc.

Steps sp1 to sp4: In a case where an abnormality has occurred in a compressor and at least one of the abnormality detection switches S11 and S12 pertaining to the high pressure abnormality detection board P1 has changed from on to off (Yes in sp1, Yes sp2), the connection point sa1 changes from about 16 V to a high impedance state. Furthermore, in a case where the central control switch S14 pertaining to the high pressure abnormality detection board P1 has changed from on to off because of leakage current occurring in at least one of the motors M2, M4, etc. (Yes in sp3), the connection point sa2 changes from about 0 V to a high impedance state. Because of this, the voltage between both ends of the relay coil S25a of the power supply control switch 25 pertaining to the compressor inverter board P2 changes from the state in which it had been about 16 V, and the relay switch S25b changes from on to off (sp4).

Steps sp5 to sp7: Because the relay switch S25b is off, the supply of the commercial power V0 from the commercial power supply 90 to the switching power supply 24 on the compressor inverter board P2 is cut off. For that reason, the switching power supply 24 stops generating and outputting the first power V1 and the second power V2 (sp5). Because of this, the compressor microcomputer 30 that had been operating using the first power V1 stops controlling the compressor gate driver 29, and the compressor gate driver 29 that had been operating using the second power V2 also stops driving the compressor inverter 28 (sp6). Consequently, the output of the drive voltages SU1 to SW1 to the compressor motor M2 is stopped and the compressor motor M2 stops rotating, so the operation of the compressor is stopped (sp7).

Steps sp8 to sp10: Meanwhile, the supply of the second power V2 to the switching power supply 43 on the fan inverter board P4 stops as a result of the switching power supply 24 having stopped generating and outputting the second power V2 in step sp5. Because of this, the switching power supply 43 stops generating and outputting the third power V3 (sp8). The fan microcomputer 46 that had been operating using the third power V3 stops controlling the fan gate driver 45. Moreover, because of step sp5, the supply of the second power V2 to the fan gate driver 45 is also cut off, so the fan gate driver 45 also stops driving the fan inverter 44 (sp9). Consequently, the output of the drive voltages SU2 to SW2 to the fan motor M4 is stopped and the fan motor M4 stops rotating, so the operation of the fan is also stopped (sp10).

(4) Characteristics 4-1

In the power supply control device 10 pertaining to the present embodiment, in a case where there is an abnormality relating to a compressor, the switching power supply 24 on the compressor inverter board P2 stops generating the first power V1, so the supply of the first power V1 from the switching power supply 24 to the compressor microcomputer 30 is cut off. When the first power V1 becomes no longer supplied to the compressor microcomputer 30, the compressor microcomputer 30 no longer outputs the signal for controlling the compressor inverter 28, so the output of the drive voltages SU1 to SW1 from the compressor inverter 28 to the compressor motor M2 stops and the operation of the compressor stops.

In particular, the first power V1 is light current compared to the power supplied from the commercial power supply 90 to the line L23 to the compressor inverter 28. For that reason, in a case where a main circuit switch for cutting off the supply of power from the commercial power supply 90 to the inverter 28 is disposed on the line between the commercial power supply 90 and the rectifier 26, even if the switch has melted, in the present embodiment the compressor microcomputer 30 to which the supply of the first power V1 has been cut off stops the drive control itself, so the driving of the compressor motor M2 stops. Consequently, the operation of the compressor can be reliably stopped regardless of whether or not the main circuit switch has melted and also without the compressor microcomputer 30 becoming uncontrollable.

4-2

In particular, in the power supply control device 10 pertaining to the present embodiment, in a case where there is an abnormality relating to a compressor, the supply of the commercial power V0 from the commercial power supply 90 to the switching power supply 24 is cut off by the power supply control switch 25, so the first power V1 becomes no longer supplied to the compressor microcomputer 30. Because of this, first, the drive control of the compressor inverter 28 by the compressor microcomputer 30 becomes no longer performed, and as a result the output of the drive voltages SU1 to SW1 to the compressor motor M2 by the compressor inverter 28 is stopped.

4-3

Furthermore, in the power supply control device 10 pertaining to the present embodiment, the power supply control switch S25 has the switch S25b disposed on the power supply line L21 interconnecting the commercial power supply 90 and the switching power supply 24. Additionally, the current flowing through the power supply line L21 is smaller than the current flowing in the compressor inverter 28. That is, it can be said that the power supply line L21 is a line for light current. Because of this, a relay switch for light current can be used as the relay switch S25b disposed on the power supply line L21, so costs can be reduced. Moreover, a large current such as the one flowing in the compressor inverter 28 does not flow in the relay switch S25b, so the danger that the relay switch S25b will be melted is also low.

4-4

Furthermore, in the power supply control device 10 pertaining to the present embodiment, in a case where there is an abnormality relating to a compressor, the switching power supply 24 itself stops driving, so the generation of the second power V2 also stops in addition to the generation of the first power V1. As a result, not only the supply of the first power V1 to the compressor microcomputer 30 but also the supply of the second power V2 to the compressor gate driver 29 is cut off. Because of this, in a case where there is an abnormality relating to a compressor, the output of the drive voltages SU1 to SW1 by the compressor inverter 28 stops more reliably.

(5) Example Modifications

An embodiment of the present invention has been described above on the basis of the drawings, but the specific configurations thereof are not limited to the above embodiment and can be changed without departing from the spirit of the invention.

(5-1) Example Modification A

In the above embodiment, a case was described where, as shown in FIG. 2, the two abnormality detection switches S11 and S12 are disposed. However, the number of the abnormality detection switches S11 and S12 is not limited to two. The abnormality detection switches S11 and S12 may also be one or a plurality. In a case where a plurality of the abnormality detection switches S11 and S12 are disposed, the switches S11 and S12 are connected in series to one another.

(5-2) Example Modification B

In the above embodiment, a case was described where, as shown in FIG. 3, the relay switch S25b pertaining to the power supply control switch S25 is disposed in series on the power supply line L21 and the generation and output of power by the switching power supply 24 itself is stopped as a result of the supply of the commercial power V0 to the switching power supply 24 being cut off. However, in the present invention, it suffices for the switching power supply 24 itself to stop generating and outputting power in a case where an abnormality relating to a compressor has occurred; consequently, the configuration of the power supply control device 10 is not limited to the configuration shown in FIG. 3.

Figure 8:
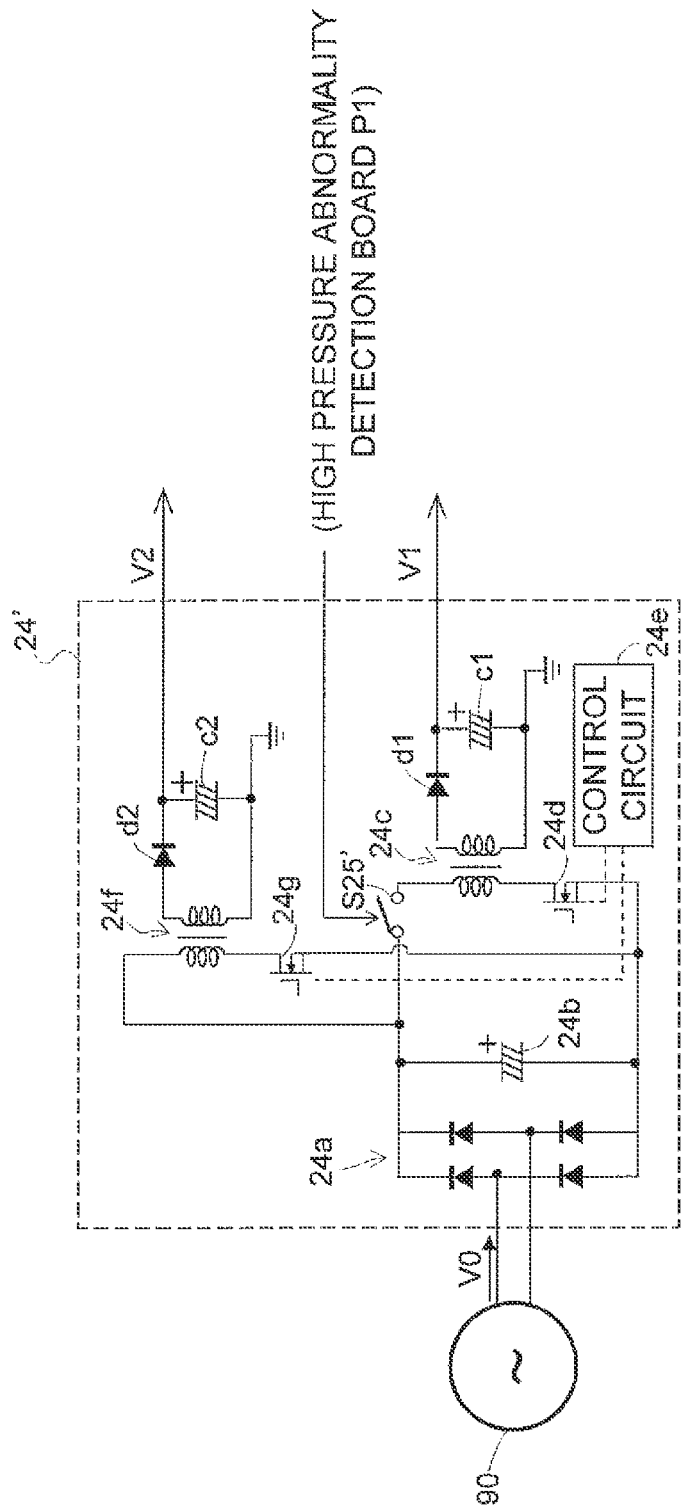
FIG. 8 shows an example of a circuit configuration of a switching power supply in example modification B.

In addition to the configuration shown in FIG. 3, examples of the method by which the switching power supply 24 itself stops generating and outputting power include the configuration shown in FIG. 8. In FIG. 8, a power supply control switch S25' is disposed on the primary side circuit for generating the first power V1 inside a switching power supply 24', and the switch S25' switches on and off in conjunction with the abnormality detection switches S11 and S12 and the central control switch S14 on the high pressure abnormality detection board P1, for example. In a case where the switching power supply 24' takes the configuration shown in FIG. 8, the power supply control switch S25' is not disposed on the power supply line L21 of the compressor inverter board P2 of FIG. 3 because it is disposed inside the switching power supply 24'.

According to the switching power supply 24' pertaining to the configuration shown in FIG. 8, the power supply control switch S25' switches on if the abnormality detection switches S11 and S12 and the central control switch S14 are all on and switches off if at least one of the abnormality detection switches S11 and S12 and the central control switch S14 is off. Consequently, in a case where at least one of an abnormality relating to a compressor and leakage current in the motors M4, etc. has occurred, at least one of the corresponding abnormality detection switches S11 and S12 and central control switch S14 switches off and the power supply control switch S25' also switches off. For that reason, the switching power supply 24' stops generating and outputting the first power V1. Consequently, the driving of the compressor microcomputer 30 stops, the rotation of the compressor motor M2 stops, and the operation of the compressor stops.

At the same time, the switching power supply 24' pertaining to the configuration shown in FIG. 8 continues to generate and output the second power V2 even if the power supply control switch S25' has switched off. That is, the switching power supply 24' only stops generating and outputting the first power V1 supplied to the compressor microcomputer 30 in a case where at least one of an abnormality relating to a compressor and leakage current in the motors M2, M4, etc. has occurred. Consequently, in the switching power supply 24' pertaining to the configuration shown in FIG. 8, it becomes possible to perform an operation where only the fan is operated even if the compressor has been stopped, so a wide range of control can be performed compared to the case of the above embodiment.

(5-3) Example Modification C

In the above embodiment, a case was described where the central control microcomputer 13 detects leakage current of the motors M2, M4, etc. However, the central control microcomputer 13 may also detect, as abnormalities relating to the outdoor units, an abnormality in the rotation of the outdoor fans and a thermal abnormality in the indoor unit overall caused by the combustion of an outdoor unit. In a case where the central control microcomputer 13 has detected even one of these abnormalities, the central control switch S14 switches off, so the generation and output of power by the switching power supply 24 is stopped, and as a result the driving of the compressor stops.

(5-4) Example Modification D

In the above embodiment, a case was described where the compressors were disposed in the outdoor units of the air conditioning system. However, the compressors may also be compressors disposed in heat pump devices.

(5-5) Example Modification E

In the above embodiment, a case was described where the first power V1 and the third power V3 were powers having a voltage of about 5 V and where the second power was power having a voltage of about 15 V. However, the voltage values that the powers V1 to V3 have are not limited to these values and can also be about 3 V and about 10 V, for example.

What is claimed is:
1. A power supply control device comprising:
an inverter having plural switching elements, the inverter being configured
to generate drive voltages usable to drive a compressor motor that is a drive source of a compressor as a result of the switching elements switching on or off, and
to output the drive voltages to the compressor motor;
an inverter controller configured to control the inverter;
a device power supply configured to generate a first power supplied to the inverter controller;
a detector arranged and configured to detect whether there is an abnormality relating to the compressor; and
a power supply controller configured to stop generation of the first power by the device power supply to thereby stop the control of the inverter controller in a case where there is an abnormality relating to the compressor.
2. The power supply control device according to claim 1, wherein
the device power supply is further configured to generate the first power using outside power supplied from an outside power supply located outside, and
the power supply controller is further configured to stop the generation of the first power by the device power supply by cutting off a supply of the outside power to the device power supply in a case where there is an abnormality relating to the compressor.
3. The power supply control device according to claim 2, wherein the power supply controller has a relay disposed on a power supply line interconnecting the outside power supply and the device power supply, and a current flowing through the power supply line is smaller than a current flowing in the inverter.

4. The power supply control device according to claim 1, further comprising an inverter driver arranged and configured to switch each of the switching elements on or off based on an output of the inverter controller, the device power supply being further configured to generate a second power that is separate from the first power and is supplied to the inverter driver, and to stop generating the second power in a case where there is an abnormality relating to the compressor.

5. The power supply control device according to claim 2, further comprising an inverter driver arranged and configured to switch each of the switching elements on or off based on an output of the inverter controller, the device power supply being further configured to generate a second power that is separate from the first power and is supplied to the inverter driver, and to stop generating the second power in a case where there is an abnormality relating to the compressor.

6. The power supply control device according to claim 3, further comprising an inverter driver arranged and configured to switch each of the switching elements on or off based on an output of the inverter controller, the device power supply being further configured to generate a second power that is separate from the first power and is supplied to the inverter driver, and to stop generating the second power in a case where there is an abnormality relating to the compressor.

* * * * *